ÜUnited States Patent Office 3,239,580
Patented Mar. 8, 1966

3,239,580
ELASTOMERIC EPOXY RESINS
Elmer L. Pendleton and John C. Smith, Lake Jackson, Tex., assignors to The Dow Chemical Company, Midland, Mich., a corporation of Delaware
No Drawing. Filed Mar. 19, 1962, Ser. No. 180,858
14 Claims. (Cl. 260—830)

The invention pertains to a method of improving epoxy resin compositions and to the compositions so improved.

By the term, epoxy resin compositions, is usually meant epoxide compounds consisting of glycidyl ethers and polyethers and oxidized olefins, having an average of more than one terminal oxirane group per molecule and is generally extended to include the cured or hardened product resulting from admixture therewith of a cross-linking agent followed by a setting period usually at somewhat elevated temperatures.

The epoxy resin composition contemplated by the invention is that which employs a polyoxyalkyleneglycol (hereinafter usually called memerly a polyglycol) in the preparation of the epoxy resin.

Epoxy resins, made by reacting an aliphatic polyhydric alcohol (the term herein being used to include di-, tri-, and higher alcohols), including polyglycols, with an epihalohydrin, are well known. The process consists essentially of adding the epihalohydrin slowly to the polyhydric alcohol in the presence of a catalyst, usually a Lewis acid, to form a halohydrin intermediate, subsequently (usually by a single procedural step) dehydrohalogenating the intermediate halohydrin and reforming oxirane rings by admixing a suitable agent therewith, most usually an aqueous solution of NaOH, and separating the resin product so made from the reaction medium and by-product sodium halide salt. The NaOH is usually added in an amount sufficient, or slightly in excess of that necessary, to react with the halogen provided by the epihalohydrin.

In the known process, there is usually employed an amount of epihalohydrin, most generally epichlorohydrin, necessary to provide at least twice the equivalent weight thereof necessary for reaction with the hydroxyl groups of the alcohol. The purpose thereof is to minimize the number of unreacted hydroxyl groups which are present in the resin. The formation of terminal hydroxyl groups, rather than oxirane, i.e.,

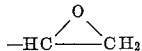

is to be avoided as much as possible because their presence results in the subsequently cured resins having lower physical strength properties.

Despite the efforts to avoid terminal hydroxyls by employing excess epihalohydrin and regardless of how great the molar excess thereof, some terminal hydroxyls remain. The epoxy resin, therefore, is a random addition with an undesirably wide distribution of a molecular species among which are monoepoxides and diepoxides, and some higher polyepoxides as well as some unreacted polyglycol molecules containing no epoxide group. The monoepoxides impair the strength properties of the subsequently cured resin, since they cause shorter chains and hence lower molecular weight. Instead of a desired functionality of at least two, their functionality is always below two. Such monoepoxides do not lend themselves to cross-linking during subsequent cure and result in weakening of the cured resin.

The principal object of the invention is to provide a method of modifying known glycidyl ethers of polyglycols having an average of less than the desired two oxirane groups per molecule to give a resin having an oxirane functionality of substantially two and to provide a resin comprising such ether, which, when cured, has high flexibility and increased strength properties. A further object is to provide an improved diglycidyl ether of polyglycols which is especially suitable for admixture with known epoxy resins, particularly glycidyl ethers of binuclear phenols (having an average oxirane functionality of at least about 1.6 per molecule), to impart added flexibility thereto.

The manner and means of attaining these and related objects are made clear in the ensuing description and are concisely defined in the appended claims.

The invention contemplates the method of improving known epoxy resins made by epoxidizing aliphatic polyglycols, the resulting composition, and the method of increasing the flexibility of more rigid known epoxy resins. Particularly suitable known epoxy resins for such use are the ethers and polyethers of 4,4'-isopropylidenediphenol (known as bisphenol A). The preferred weight proportions are from 60 to 70 parts of the improved resin of the invention and from 40-30 parts of the bisphenol A derived resin.

The invention encompasses admixing a diisocyanate with an epoxy resin whose principal constituent has the general formula:

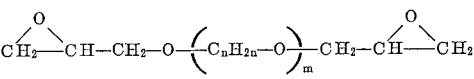

but which also contains significant amounts of a monoglycidyl ether, having the generic formula:

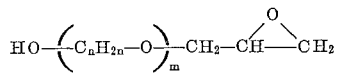

where, in each formula, $n$ is from 2 to about 6 and $m$ is from 1 to about 40, in relative amounts of the diisocyanate and epoxy resin and under reaction conditions to provide linkages through the isocyanate groups with the terminal hydroxyl groups of the monoglycidyl ethers. The so treated resin comprises, therefore, a mixture of diglycidyl ethers or polyethers of a polyglycol and isocyanate-linked monoglycidyl ethers of the polyglycol.

The resulting so modified and improved epoxy resin may be cured to a flexible, durable, long-lived resin having excellent elongation, strength, electrical, and corrosion-resistant properties, and is suitable for a wide number of uses among which are encapsulating, imbedding, impregnating, laminating, coating, and casting of plastic articles, generally. The resin of the invention is also highly useful as an additive to unmodified epoxy resins of all types, prior to cure, for the purpose of imparting additional flexibility thereto upon subsequent cure. The curing agents employed may be any one, or compatible mixture, of curing agents known to be effective for cross-linking epoxy resins, among which are primary, secondary, and tertiary aliphatic and aromatic amines, dicarboxylic and higher polycarboxylic acids and anhydrides thereof, Lewis acids and ether and amine complexes thereof, phenols, and inorganic bases.

The diisocyanate may be any organic aliphatic or aromatic diisocyanate, e.g., hexamethylene diisocyanate, 4,4'-methylenebis(phenylisocyanate) and tolylene diisocyanate.

The invention is practiced by admixing a glycidyl ether of a polyglycol having an average oxirane functionality per molecule of more than one and less than two, containing some monoglycidyl ether of such polyglycol, with a diisocyanate in an amount sufficient to provide between about 0.8 and about 2.5 weight equivalents of isocyanate groups per weight equivalent of hydroxyl groups present in said monoglycidyl ether, preferably in the presence of a catalyst. The catalyst, when employed, is usually selected from the class consisting of (1) metal alkyl carboxylates and metal carboxylates, e.g., dibutyl tin dilaurate, stannous octoate, stannous laurate, and (2) tertiary amines, e.g., triethylenediamine, triethylamine, and benzyldimethylamine and mixtures of amines, in an amount of either (1) or (2) of between about 0.01% and about 0.2% by weight of the reaction mixture, dependent in part upon the amount of diisocyanate present. Although a catalyst is not essential to the practice of the invention, the presence thereof advantageously accelerates the rate of reaction.

When less than about 0.8 weight equivalent of isocyanate groups is provided per weight equivalent of hydroxyl groups, the unreacted hydroxyl groups remaining lessen the strength of the subsequently cured resin. When more than about 2.5 weight equivalents of isocyanate groups per weight equivalent of hydroxyl groups are provided, the resin tends to lose some of the desired properties associated with epoxy resins.

The resin prepared according to the invention is particularly useful for admixture with known epoxy resins, e.g., condensation products of polynuclear phenols and epichlorohydrin or such condensation products further reacted with additional polynuclear phenols, to impart flexibility to the epoxy resin when subsequently admixed with a cross-linking agent and cured.

The invention is best carried out in a reaction vessel equipped with heat control, temperature recording, and stirring means and provided with a dropping funnel, take-off arm, reflux condenser, nitrogen gas supply and evacuating lines for adjusting the pressure in the vessel. The take-off arm may be advantageously replaceable by the reflux condenser and, for convenience, the nitrogen supply line may be provided with a built-in thermometer. The polyglycol glycidyl ether, comprising a diglycidyl ether and some monoglycidyl ether, the diisocyanate, and a catalyst (when employed) are heated usually at a temperature of between about 50° and 150° C., preferably at between about 80° and 130° C. for from about 0.25 to 5 hours, usually for from about 0.5 to 3 hours, preferably (but not necessarily) at a reduced pressure, and cooled. The composition so made is the improved epoxy resin of the invention wherein the hydroxyl groups of the monoglycidyl ether have been linked through isocyanate groups, considered to be the reaction represented by the equation:

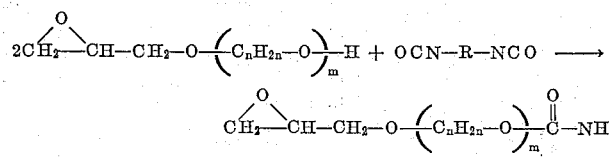 + OCN—R—NCO ⟶

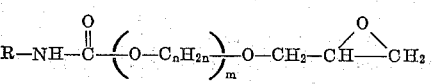

wherein R is a residual alkylene or arylene residue, $n$ is 2 to about 6 and $m$ is 1 to about 40.

In the preferred mode of practicing the invention, the polyglycol glycidyl ether is usually first analyzed by one of several known techniques, to determine the percent of hydroxyl groups present on the monoglycidyl ether therein. The vessel is usually purged with nitrogen gas. The glycidyl ether is then put into the vessel and heated to between about 80° and 130° C., at a reduced pressure, to remove readily volatile materials. It is then cooled to below about 80° C. and the diisocyanate, in the desired molar amount, together with a catalyst, if employed, added thereto, accompanied by stirring. The resulting admixture is then heated up to and held at between about 80° and 130° C. with continued stirring for between about 0.5 and 3 hours. The recommended temperature is usually between about 110° C. and 120° C. Lower temperatures than about 100° C. require undesirably long reaction periods and tend toward an incomplete reaction. Temperatures appreciably above 120° C. encourage undesirable side reactions. The entire reaction product so produced is the improved resin of the invention without need of separation or purification steps. The resin so made is ready for use, either by admixture with one or more known epoxy resins (as aforesaid) followed by admixture with a known curing agent, or by admixture directly with a known curing agent and thereafter heat-set to a durable coating, laminant, casting, or the like.

The following examples are illustrative of modes of carrying out the invention.

EXAMPLE 1

In a 2-liter, 3-necked round-bottom flask were placed 1000 parts by weight of the glycidyl ether of a 400 molecular weight polypropylene glycol prepared using a 1.5 to 1 ratio of equivalent weights of epichlorohydrin per weight equivalent of OH groups. The glycidyl ether had an oxirane oxygen content of 4.98% and contained 0.8% OH groups by weight, as determined by infrared analysis. The flask was fitted with a thermometer, stirrer, and take-off arm. The material was stirred while being heated to 120° C. at less than 1 mm. of Hg pressure to remove volatile substances. It was then cooled to 65° and the thermometer was replaced with a nitrogen inlet-thermometer attachment. The system was flushed with nitrogen. Then 41.0 parts by weight of tolylene diisocyanate (sufficient to provide one equivalent weight of NCO groups per equivalent weight of OH) was added. The solution was heated slowly, while being stirred over a 30 minute period, to a temperature of 80° C.; then heated relatively rapidly to 120° C. The material was held at 120°±5° C. for 50 minutes and then the pressure reduced to less than 1 mm. of Hg. After 25 minutes at the reduced temperature, the material was cooled to room temperature. The product so produced was a yellow fluid material with a residual unreacted tolylene diisocyanate content of 0.3%. By analysis, this product had 4.86% oxirane oxygen. By comparison to the untreated polyoxypropylene glycol ether (which had 4.98% oxirane oxygen) it can be seen that the oxirane content was not substantially changed, but the hydroxyl content had been substantially reduced by reaction thereof with NCO groups. Analysis for hydroxyl groups, by infrared, showed that substantially none remained.

EXAMPLE 2

The apparatus, procedure, and glycidyl ether employed were those described in Example 1. 900 parts by weight of glycidyl ether of polyoxypropylene was devolatilized at 120° C. and at less than 1 mm. Hg pressure for 30 minutes. Tolylene diisocyanate in an amount of 55.4 parts were added at 80° C. These amounts make a 1.5 to 1 ratio of NCO groups to OH groups. The solution was heated over the course of 1 hour, while being stirred under a nitrogen atmosphere, to attain a temperature of 120° and held at that temperature for 30 minutes. The pressure was then reduced to less than 1 mm. of Hg and heating at the reduced temperature continued for about 20 minutes. The material was then allowed to cool to room temperature. The product was a yellow, thin liquid with a residual tolylene diisocyanate content of 1.1%. The oxirane oxygen content was about 4.7%.

EXAMPLE 3

The procedure, apparatus, and glycidyl ether employed in this example were substantially the same as that described in Examples 1 and 2 except the ratio of NCO groups to OH groups was that provided by 1000 parts by weight of the glycidyl ether of polyoxypropylene glycol and 82 parts of tolylene diisocyanate. These amounts correspond to a 2 to 1 ratio of NCO groups to OH groups. After a reaction of 30 minutes at 120° C. the material was cooled. The thus modified resin was a clear yellow liquid. An analysis for unreacted tolylene diisocyanate gave 0.51% and an oxirane content of about 4.3%.

EXAMPLE 4

This example was similar to the previous examples but employed 900 parts by weight of the glycidyl ether of polyoxypropylene glycol and 92.2 parts of tolylene diisocyanate. These amounts provide a ratio of equivalents of NCO to OH of 2.5 to 1. The thus modified resin has a residual tolylene diisocyanate content of 0.62% and an oxirane oxygen content of about 4.25%.

EXAMPLE 5

The procedure employed was similar to that described above except a catalyst was employed. The glycidyl ether of 400 molecular weight polyoxypropylene glycol, employed above, having an OH content of 0.65%, was employed. The relative amounts of the reactants, were 1002 parts by weight of the glycidyl ether and 33.3 parts of tolylene diisocyanate. A catalyst, dibutyl tin dilaurate, was used in an amount of 0.02% by weight of the polyglycol glycidyl ether. The ratio of NCO groups to OH groups was 1:1. The reaction was heated to 120° and held at that temperature for 3 hours and then cooled. The resulting modified resin was a fluid, light yellow liquid with a Gardner viscosity of E-F. The oxirane oxygen content was 4.62% compared to 4.83% for the untreated glycidyl ether.

EXAMPLE 6

This example was carried out in substantially the same manner as that of Example 5 except that the ratio of NCO groups to OH groups was 1.2 to 1. The product was a light yellow liquid with a Gardner color of 5 and a Gardner viscosity of G. Residual tolylene diisocyanate was 0.005%. The oxirane oxygen content was 4.62%.

EXAMPLE 7

The procedure was substantially the same as that for Example 5 except that the ratio of NCO groups to OH groups was 1.4 to 1. The product so produced was a yellow liquid with a Gardner color of 7 and a Gardner viscosity of H. The residual tolylene diisocyanate was 0.01%, and the oxirane oxygene was 4.54%.

EXAMPLE 8

This example was run in substantially the same manner as that of Example 6 except that 0.2% by weight of dibutyl tin dilaurate was used as a catalyst and the reaction was run for only 30 minutes at 120° C. The resulting product had a residual tolylene diisocyanate content of 0.16%, a Gardner color of 2–3, and Gardner viscosity of E. The oxirane oxygen content was 4.78%.

EXAMPLE 9

This example was run substantially as described in Example 8 except that trimethylene diamine was used as a cataylst in an amount of 0.02% by weight. The product so produced was a yellow liquid with a residual tolylene diisocyanate content of 0.04%, a Gardner color of 5, and a Gardner viscosity of D–E. The oxirane oxygen content was 4.74%.

EXAMPLE 10

This material was prepared substantially as described in Example 8 except that trimethylenediamine was used as a catalyst in an amount of 0.20% by weight. The product so produced was a yellow liquid with a residual tolylene diisocyanate content of less than 0.02%, a Gardner viscosity of E, a Gardner color of 5, and an oxirane oxygen content of 4.67%.

EXAMPLE 11

In this preparation, a glycidyl ether of a polyglycol was used which differed from those used above in that it had been prepared by employing less epichlorohydrin (1.0 equivalent weight per equivalent weight of OH present in the polyglycol) in the prepartion thereof. As a consequence, it had an OH content of 1.25% by weight. This amount of the glycidyl ether (561 parts by weight) was reacted with 35.4 parts of tolylene diisocyanate at 120° C. for 3 hours. 0.11 part (0.02%) of dibutyl tin dilaurate was employed as a catalyst. The product so made was a yellow liquid with a Gardner color of 6 and a Gardner viscosity of J–K. It had 0.005% residual tolylene diisocyanate. The oxirane oxygene content was 4.43%, as compared to 4.93% for the untreated material.

EXAMPLE 12

The glycidyl ether of a polyglycol used in this example had been prepared by reacting a polyoxypropylene glycol of 2000 molecular weight with epichlorohydrin in an amount which provided about 0.5 weight equivalent of oxirane groups per weight equivalent of OH groups. The material so made had an oxirane oxygen content of 0.6% a chlorine content of 0.42%, and an OH content of 0.81%. It was employed according to the invention substantially as described for previous examples except that 920 parts of the glycidyl ether of the polyoxyglycol and 33.6 parts of tolylene diisocyanate were employed. The tolylene diisocyanate was added to the glycidyl ether of the polyglycol after devolatilization at 120° for 30 minutes. The product was a pale yellow liquid with an oxirane oxygen content of 0.54%. The residual tolylene diisocyanate was 0.82%.

The above examples represent modification of glycidyl ethers of polyoxyglycols according to the invention. To show the utilization of these modified glycidyl ethers, portions thereof were admixed with a known unmodified epoxy resin, e.g., D.E.R. 331, a well known glycidyl ether of 4,4'-isopropylidenediphenol (known as bisphenol A) having an epoxide equivalent weight of between 187 and 193, and D.E.R. 661, a well known glycidyl polyether of bisphenol A having an epoxide equivalent weight of between 475 and 575, and the resulting admixture subsequently cured with an amine curing agent to give an improved resin having enhanced physical properties. For the purpose of comparing certain physical properties of the improved cured polyglycol-derived epoxy resin of the invention when admixed with a bisphenol derived epoxy resin, as subsequently shown in Examples 13 and 14, in contrast to the same polyglycol-derived epoxy resin but unmodified by the invention when admixed with the same proportion of the same bisphenol-derived epoxy resin, a mixture of 66.6% of the 400 molecular weight polypropylene glycidyl ether of Example 11 and 33.4% of D.E.R. 661 was cured with the stoichiometric amount of a mixture of 15% diethylene triamine and 85% ethanolamine. The cured product has the following properties:

Tensile strength _____ p.s.i__ 200  
Elongation _____ percent__ 200  
Shore A hardness _____ 35

EXAMPLE 13

A mixture of 67% of the resin produced in Example 11 and 33% of D.E.R. 331 (as described above) was cured with a solution consisting of 85% ethanolamine and 15% diethylenetriamine, in an amount necessary to provide about 1 weight equivalent of amine hydrogens per weight equivalent of oxirane groups, for 24 hours at 90° C. The resin so produced was an elastomer which had a tensile strength of 396 p.s.i., and elongation of 231%, and a Shore A hardness of 43.

EXAMPLE 14

A solution composed of 67% of the product of Example 11 and 33% of D.E.R. 661 (as above described) was cured with a solution consisting of 85% ethanolamine and 15% diethylenetriamine, in an amount sufficient to provide about 1 weight equivalent of amine hydrogens per weight equivalent of oxirane groups, at 90° for 24 hours. The resin so produced was an elastomer which had a tensile strength of 340 p.s.i., an elongation of 305%, and a Shore A hardness of 40.

Comparison of the improved properties of the modified resin of the invention produced in Examples 13 and 14 to the unmodified resin shows the marked superiority of the resin of the invention.

To show the enhanced properties of conventional epoxy resins as a result of admixture with a glycidyl ether of a polyoxyalkylene glycol modified acording to the invention, Examples 15–24 were run. The procedure followed was to employ one of the modified glycidyl ethers of 400 molecular weight polypropylene glycol, prepared in the manner described in the examples above, and admix 67 parts by weight of the so modified resin with 33 parts by weight of the conventional epoxy resin and a sufficient amount of an alkanol amine-alkylenepolyamine curing agent mixture to provide substantially one equivalent weight of amine hydrogen atoms per oxirane groups present in the epoxy resin mixture. The conventional epoxy resin employed and the composition of the curing agent are shown in the table, infra. The epoxy resin-curing agent mixture was cured at about 80° C. for about 8 hours. The cured resin was then evaluated for tensile strength, percent elongation, and hardness, the results of which are also shown in the table. For the purposes of comparison, the glycidyl ether of 400 molecular weight polypropylene glycol which was unmodified by the invention was admixed with one of the known epoxy resins in the same 67:33 parts by weight proportion employed in the examples. It was cured and tested similarly to the examples and is set out as Run A in the table.

*Table*

| Example No. | Resin mixture—Glycidyl ether of modified polypropylene glycol—From Example No. | Known epoxy resin | Curing agent | Physical properties of cured resin mixture | | |
|---|---|---|---|---|---|---|
| | | | | Tensile strength in p.s.i. | Percent elongation | Shore A Hardness |
| 15 | 5 | D.E.R. 331 | (a) [1] | 358 | 220 | 45 |
| 16 | 5 | D.E.R. 661 | (a) | 302 | 267 | 40 |
| 17 | 6 | D.E.R. 331 | (a) | 398 | 208 | 48 |
| 18 | 6 | D.E.R. 661 | (a) | 324 | 245 | 42 |
| 19 | 7 | D.E.R. 331 | (a) | 409 | 195 | 50 |
| 20 | 7 | D.E.R. 661 | (a) | 307 | 215 | 46 |
| 21 | 6 | D.E.R. 661 | (b) [2] | 374 | 290 | 44 |
| 22 | 6 | D.E.R. 661 | (c) [3] | 399 | 265 | 43 |
| 23 | 9 | D.E.R. 661 | (a) | 419 | 350 | 40 |
| 24 | 10 | D.E.R. 661 | (a) | 251 | 267 | 37 |
| Run A | ([4]) | D.E.R. 661 | (a) | 197 | 206 | 33 |

[1] Curing agent a is 85% ethanolamine and 15% diethylenetriamine.
[2] Curing agent b is 86.1% ethanolamine and 13.9% ethylenediamine.
[3] Curing agent c is 76.2% ethanolamine and 23.8% hexamethylenediamine.
[4] Unmodified glycidyl ether of 400 molecular weight polypropylene glycol of Example 6 for comparative purposes.

Reference to Examples 1–12 above shows various modes of modifying epoxy resins, prepared from polyoxyalkylene glycols, in accordance with the invention. Other amounts and reaction conditions within the spirit of the invention may be readily seen. Reference to Examples 13 and 14 shows the excellence of the cured resin of the invention in contrast to a comparable epoxy resin which had not been treated and modified in accordance with the invention. Reference to Examples 15–24 as set out in the table above, shows the marked advantages attained by admixing resin, modified according to the invention, with epoxy resins which have not been so modified. These advantages are particularly striking when compared to Run A wherein the same conventional epoxy resins were employed in the same amounts as in Examples 18, 21, and 22 except that the epoxy resin, employing the polypropylene glycol as the polyhydric compound, had not been treated and so modified in accordance with the invention.

The invention herein described was based upon the unexpected discovery that an isocyanate-bearing organic compound introduced into an organic diepoxide containing monoglycidyl hydroxy ether results in a reaction between the NCO groups and any hydrogen-bearing functional groups and the hydroxyl groups, but does not result in any measurable reaction between the NCO groups and the oxirane groups present.

Having described the invention, what we claim and desire to protect by Letters Patent is:

1. The method of modifying a monoglycidyl hydroxy ether having a terminal hydroxyl group inherently present in admixture with diglycidyl ethers prepared by epoxidizing oxyalkylene glycols having from 2 to about 240 carbon atoms per molecule in the oxyalkylene portion thereof, and having substantially no hydroxy groups on the diglycidyl ether, to increase the terminal oxirane functionality thereof by converting hydroxyl groups of the monoglycidyl hydroxy ethers, the presence of which impairs the strength and elongation properties of the diglycidyl ethers when cured, to a resin curable to a high-strength flexible durable component, which consists essentially of admixing with said mixture of monoglycidyl hydroxy and diglycidyl ethers, an organic diisocyanate in an amount sufficient to provide between about 0.8 and about 2.5 weight equivalents of NCO groups per weight equivalent of OH groups on said monoglycidyl hydroxy ethers, and heating the resulting mixture for from about 0.25 to about 5 hours at a temperature between about 80° C. and about 130° C.

2. The method according to claim 1 wherein the diisocyanate employed is selected from the class consisting of alkylene diisocyanates and tolylene diisocyanate.

3. The method according to claim 1 wherein the diglycidyl ether is the diglycidyl ether of polyoxypropylene glycol.

4. The method according to claim 1 wherein the ratio of the equivalent weight of NCO groups to the equivalent weight of terminal OH groups on said monoglycidyl ether is between about 1 and about 2.

5. The method according to claim 4 wherein the temperature of reaction is between about 100 and 120° C.

6. The method according to claim 1 wherein a catalyst selected from the class consisting of metal carboxylates and tertiary amines is present in an amount between 0.01 and 1.0 percent by weight of the reaction mixture.

7. An improved high strength resin composition comprising (1) an epoxy resin having the formula:

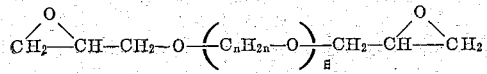

and (2) a strength-imparting compound having the formula:

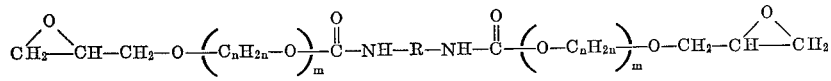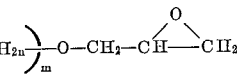

wherein R is a residue selected from the class consisting of alkylene and arylene, $n$ is from 2 to about 6 and $m$ is from 1 to about 40, said strength-imparting compound being formed by reaction in situ of (a) a normally strength-impairing contaminant inherently present in said epoxy resin as made having the formula:

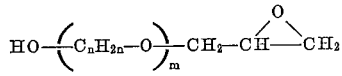

and (b) an organic diisocyanate, admixed therewith in an amount sufficient to provide between about 0.8 and about 2.5 weight equivalents of NCO groups of said diisocyanate per equivalent weight of terminal OH groups of said epoxy resin, the letter symbols in the above formulae, other than established symbols for chemical elements having the following meaning: R is a group selected from the class consisting of alkylene and arylene residues of diisocyanate, $n$ in each formulae is an integer of from 2 to about 6, and $m$ is an integer of from 1 to about 40.

8. The improved resin of claim 7 wherein the residue of the diisocyanate is a tolylene group.

9. An improved resin made by reacting a diglycidyl ether of a polyoxyalkylene glycol having from 2 to about 240 carbon atoms per molecule in the oxyalkylene portion thereof, and having substantially no hydroxy groups on the diglycidyl ether present, and containing some monoglycidyl ether having terminal hydroxyl groups with a diisocyanate in an amount sufficient to provide between about 0.8 and 2.5 isocyanate groups per terminal hydroxyl group at a temperature of between about 80° and 130° C. for from about 0.25 and 5 hours.

10. A hard durable, high strength and corrosion-resistant resin having improved flexibility consisting of the resin of claim 9 admixed with a cross-linking agent selected from the class consisting of aliphatic and aromatic primary, secondary, and tertiary amines, dicarboxylic acids and anhydrides thereof, and Lewis acids and ether and amine complexes thereof.

11. The resin of claim 9 wherein said cross-linking agent is an amine mixture consisting by weight of a major proportion of an alkanol amine and a minor proportion of an alkylene amine selected from the class consisting of alkylene polyamines and polyalkylenepolyamines.

12. The cured hardened mixture of (1) a glycidyl ether having between 1 and 2 oxirane groups per molecule prepared by epoxidizing a polynuclear phenol and (2) the resin of claim 10.

13. The resin of claim 12 wherein said glycidyl ether is selected from the class consisting of the ether and polyethers of 4,4'-isopropylidenediphenol.

14. The resin of claim 12 wherein glycidyl ether (1) is employed in an amount of about 60–70 parts by weight and resin (2) is employed in an amount of about 40–30 parts by weight.

References Cited by the Examiner

UNITED STATES PATENTS

| | | | |
|---|---|---|---|
| 2,592,560 | 4/1952 | Greenlee | 260—2 |
| 2,809,177 | 10/1957 | Shokal | 260—77.5 |
| 2,830,038 | 4/1958 | Pattison | 260—77.5 |

FOREIGN PATENTS 871,762  6/1961  Great Britain.

LEON J. BERCOVITZ, *Primary Examiner.*

JOSEPH L. SCHOFER, *Examiner.*